Sept. 16, 1958  E. G. DE CORIOLIS ET AL  2,852,095

DEW POINT APPARATUS

Filed Sept. 12, 1956

INVENTORS.
E. G. DE CORIOLIS
BY C. C. SYKES
R. HANNA
Charles S. Haughey
ATTORNEY

2,852,095
DEW POINT APPARATUS

Ernest G. de Coriolis, Clarke C. Sykes, and Ralph Hanna, Toledo, Ohio, assignors to Surface Combustion Corporation, Toledo, Ohio, a corporation of Ohio Application September 12, 1956, Serial No. 609,505

2 Claims. (Cl. 183—62)

This invention pertains to filtering apparatus and more particularly to a filter housing containing segmented filters for use with dew point apparatus or the like.

Dew point recorders and controllers are commonly used in the field of heat-treating for accurately controlling the composition of atmosphere gases used in heat-treating furnaces. A sample of the gas is removed from the outlet line of the atmosphere generator or from the furnace chamber and supplied to the sensing device of the dew point recorder which then indicates the dew point of the atmosphere gas by means of a chart or lights. When a controller is used in combination with the recorder, a signal is fed to the former by the latter when the actual dew point is above or below that desired. The controller then supplies additional air or gas to the atmosphere generator to thereby change the air-gas ratio and the dew point of the generated gas.

The sample gas often contains impurities such as hydrocarbons or carbon particles that condense or deposit as the gas cools, tending to plug the sample gas line or the sensing element and other apparatus in the recorder itself, rendering the instrument inaccurate or inoperative. Accordingly, a filter and, at times, a condenser have been discovered to be necessary in the sample gas line to assure continuous and accurate operation of the recorder and controller, when used.

Strands of compacted glass fibers have been found to be the most desirable filter. The filter material is relatively expensive as compared to many materials, however, and tends to become contaminated quickly which causes the filtering action to be reduced and also tends to block the flow of gas to the instrument. To overcome these objections, a filter has been invented comprising a plurality of separate glass fiber pads that are arranged so as to be individually added and removed from the filter housing.

For further consideration of what is novel and the invention, refer to the following portion of the specification, the concluding claims thereof, and the accompanying drawing.

Figure 1:
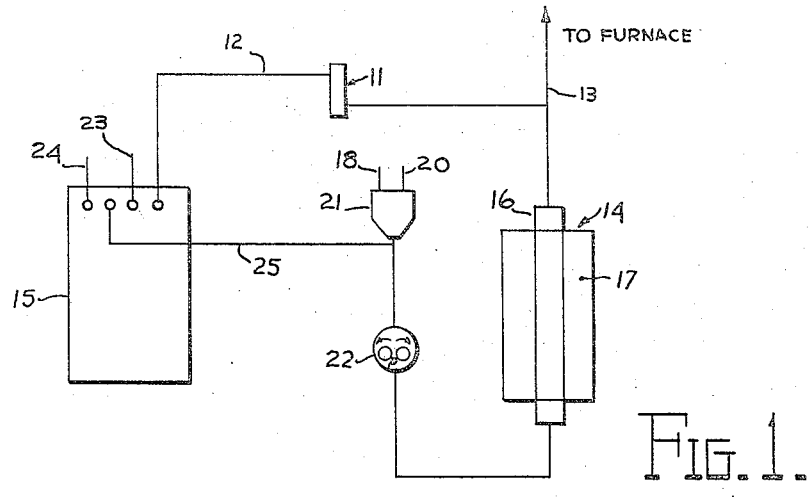
Fig. 1 is a schematic view of a system embodying the invention.

Referring to the drawing and more specifically to Fig. 1, a filter apparatus 11 is located in a line 12 which carries sample gas from outlet line 13 of gas generator 14 to a dew point recorder and controller 15. The outlet line 13 carries the generated gas from the generator 14 to the furnace chamber. The generator is of the endothermic type having a retort 16 externally heated by heating means (not shown) in chamber 17. A mixture of air and gas is passed through the retort and cracked. This mixture is supplied by an air line 18 and a gas line 20 which are connected to a mixer 21. After being mixed therein, the mixture flows through retort 16 by means of a pump 22.

The dew point of the sample gas from line 12 is measured by instrument 15 and gas is then expelled through line 23. According to whether the measured dew point is above or below that desired, a valve is opened or closed regulating the amount of additional air sucked into the mixture by pump 22 through air inlet line 24 and 25. Additional air raises the dew point of the generated gas while less air lowers it. The dew point of this gas affects various characteristics of it, such as the carburizing potential, as is well known in the art.

Figure 2:
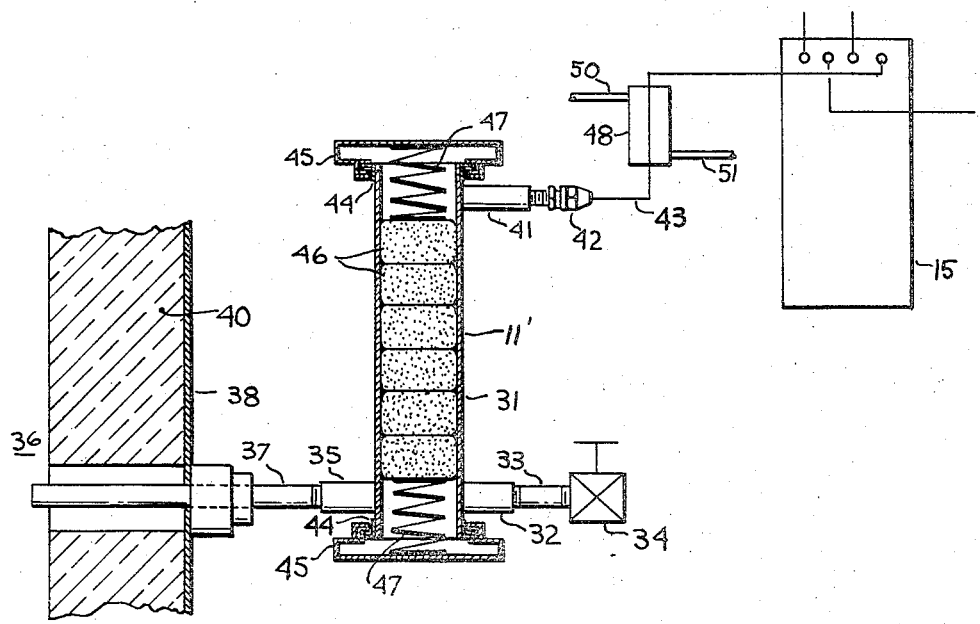
Fig. 2 is an alternate system embodying the invention.

Filter apparatus 11' of Fig. 2 is similar to filter apparatus 11 except it has a coupling 32 connected to housing or casing 31. The coupling has a pipe 33 and gate valve 34 connected to it for reasons subsequently appearing. On the opposite side of the casing in axial alignment with coupling 32 is coupling 35 connecting the filter casing with the interior of a furnace chamber 36 by means of pipe 37 extending through casing 38 and refractory 40 of the furnace. A third coupling 41 communicates with the upper portion of the casing and, through connection 42 and tube 43, communicates with a dew point instrument 15.

With this arrangement the measured dew point will be taken of gas directly from the furnace chamber rather than from gas taken at the outlet of the atmosphere generator. The preferred system depends on the individual installation. Instrument 15 of Fig. 2 will then operate similarly to that of Fig. 1, controlling an atmosphere generator (not shown here) that supplies atmosphere gas to chamber 36.

Gate valve 34 is opened only when it is desired to rod out pipe 37. This is accomplished simply by opening the valve and extending a suitable rod or brush through pipes 33 and 37. This must be done at regular intervals since the atmosphere gas entering pipe 37 cools and a portion of the carbon particles or impurities in the gas tend to deposit or condense on the interior of the pipe, quickly plugging it.

Casing 31 is provided with flanges 44 at both ends which co-act with caps 45. In the preferred arrangement, these are quick-disconnect caps and flanges such as standard radiator caps and flanges as used on automobiles. These provide tight fits yet quick access to the interior of the casing 31 by a quarter turn of the caps. With the caps removed, a new glass fiber pad 46 is placed in the upper end of the casing and a soiled one removed from the bottom. The flow of gas through the casing is in an upward direction so that the bottom pad achieves the greatest filtering action and becomes soiled the quickest. By replacing the pads at the top and removing them from the bottom a counter-current filter movement is attained with the cleanest supply of pads always present in the casing. The pads are preferably slightly larger than the inner diameter of casing 31 to assure that no gas can bypass the pads between the pads and the inner surface of the casing. Springs 47, attached to caps 45, hold the pads compactly in the central portion of the casing.

It has been found in some cases, particularly when propane gas is used with the atmosphere generator or supplied the atmosphere in the furnace as an enriching gas, that very fine white impurities are deposited therefrom. These fine particles are not entirely removed by pads 46 and it has been found necessary to place a condenser downstream of the filter for their removal. This condenser consists of a cylinder 48 concentrically surrounding tube 43 and liquid-tightly attached thereto at its ends. Cool water is supplied the cylinder through inlet 50 and is removed through outlet 51. It is preferred that this condenser be downstream of filter 11' since, if upstream, would very quickly plug due to the simultaneous deposit of carbon particles and impurities in the gas that would condense in the small tube 43.

The foregoing illustrates the best modes of carrying out the invention, the scope of which is limited only by the depending claims.

We claim:
1. Particle removing apparatus in a line supplying sample gas from a furnace chamber to a dew point instrument, said apparatus comprising: a housing forming a passage of uniform cross section; first connection means on a side of the housing near one end of said housing adapted to connect said line from said connection means to said furnace chamber; second connection means in a side of the housing near the other end of said housing adapted to connect said line from said second connection to said dew point instrument; third connection means located on the opposite side of said housing from said first connection means and axially aligned with said first connection means and its connecting line; a plurality of filter pads axially and contiguously located in said passage; closure means at both ends of said housing in non-interfering relationship with said first, second, and third connection means, whereby said closure means can be readily disconnected from said housing to allow access to said passage to permit the insertion of said pads in one end of said passage and removal of said pads from the other end of said passage; and valve means attached to said third connection means, said valve means being aligned with said third and first connection means and said connecting line, whereby said connecting line from said first connection means to said furnace chamber can be cleaned out by means of an implement inserted through said valve means and said third and first connection means.

2. In combination with a furnace chamber containing an atmosphere gas whose dew point is to be determined, a filter comprising a housing forming a passage of uniform cross-section, first connection means on a side of the housing near one end thereof, second connection means on a side of the housing near the other end of said housing, third connection means located on the opposite side of said housing from said first connection means and axially aligned with said first connection means, a plurality of filter pads axially and contiguously located in said passage, and closure means at both ends of said housing in non-interfering relationship with said first, second, and third connection means whereby said closure means may be readily disconnected from said housing to allow access to said passage to permit the installation of said pads in one end of said passage and removal of said pads from the other end of said passage; a substantially straight pipe attached to said first connection means and adapted to extend into said furnace chamber for the transmission of sample gas from said chamber to said filter; apparatus for determining the dew point of said sample gas; a conduit extending between and attached to said second connection means and said apparatus for transmission of the sample gas from said filter to said apparatus for determining the dew point; and a valve attached to said third connection means, said valve being aligned with said third and first connection means and said straight pipe, whereby said valve can be opened to permit the insertion of a substantially straight cleaning implement into said valve, and said third and first connection means to clean out said pipe.

References Cited in the file of this patent

UNITED STATES PATENTS

| | | |
|---|---|---|
| 805,305 | Lieber | Nov. 21, 1905 |
| 805,306 | Lieber | Nov. 21, 1905 |
| 1,102,685 | Proper | July 7, 1914 |
| 1,747,882 | Prazmo | Feb. 18, 1930 |
| 1,807,521 | Foulk | May 26, 1931 |
| 2,137,246 | Myers | Nov. 22, 1938 |
| 2,178,033 | Decker | Oct. 31, 1939 |
| 2,559,284 | Dickschat | July 3, 1951 |

FOREIGN PATENTS

| | | |
|---|---|---|
| 9,953 | Great Britain | Apr. 30, 1898 |